(12) United States Patent
Kobayashi

(10) Patent No.: US 7,197,755 B2
(45) Date of Patent: Mar. 27, 2007

(54) LENS CLEANER AND LENS CLEANING METHOD FOR OPTICAL DISC DEVICE

(75) Inventor: Hideya Kobayashi, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 165 days.

(21) Appl. No.: 10/684,597

(22) Filed: Oct. 14, 2003

(65) Prior Publication Data
US 2004/0139457 A1  Jul. 15, 2004

(30) Foreign Application Priority Data
Oct. 15, 2002  (JP) .............................. 2002-300668

(51) Int. Cl.
*G11B 7/085* (2006.01)
(52) U.S. Cl. .................................... 720/671
(58) Field of Classification Search ................ 720/671; 369/71
See application file for complete search history.

(56) References Cited
U.S. PATENT DOCUMENTS
5,307,334 A * 4/1994 Sato ............................ 369/71

2005/0055705 A1 * 3/2005 Fritsch et al. ............... 720/671

FOREIGN PATENT DOCUMENTS

| DE | 3925902 A1 | * | 3/1990 |
| JP | 63-313378 | | 12/1988 |
| JP | 63313378 A | * | 12/1988 |
| JP | 64-043386 | | 2/1989 |
| JP | 01-140482 | | 6/1989 |
| JP | 07-105558 | | 4/1995 |
| JP | 11-134830 | | 5/1999 |
| JP | 2002-208147 | | 7/2002 |

* cited by examiner

*Primary Examiner*—George Letscher

(57) ABSTRACT

By not recording a signal which can be the subject of focussing on a disc, a simple and inexpensive lens cleaner is provided which is able to perform cleaning of an object lens in a simple and reliable manner, without causing the disc to rotate, even in a standard disc device. In order to clean the object lens of the optical disc device, a bristle brush which makes contact with the object lens is provided on the disc, an operating ribbon for operating the disc from the outside of the device is attached to the disc, and no recording face that can be the subject of focussing by the object lens is provided, or alternatively, no signal that can be the subject of focussing by the object lens is recorded, on the face of the disc adjacent to the object lens.

15 Claims, 7 Drawing Sheets

LENS CLEANER AND LENS CLEANING METHOD FOR OPTICAL DISC DEVICE

BACKGROUND OF THE INVENTION

1. Field of the Invention

The present invention relates to an optical disc device such as a CD player or the like, and more particularly, to a lens cleaner for cleaning the object lens of an optical pick-up for optically reading out signals from a disc.

2. Description of the Related Art

In a CD player, the object lens of the optical pick-up for optically reading out signals from a disc can become soiled by adherence of dust, and the like, from the atmosphere, since the lens is exposed constantly. If soiling of this kind becomes pronounced, then it may cause adverse effects on the quality of the reproduction signal, by producing, for example, sound skipping, noise, degradation of the sound quality, or the like. If the soiling becomes further severe, then reproduction may become impossible and the device may cease to function. Therefore, from the viewpoint of maintaining the level of cleanliness of the surface of the object lens at or above a prescribed level at all times, preserving the quality of the reproduction signal, and preventing a machine from ceasing to operate due to it being in a state where reproduction is impossible, conventionally, lens cleaners of various types have been developed and used in practice.

Amongst lens cleaners of this kind, a disc type lens cleaner having cleaning members, such as brushes, or the like, provided on one side of a disc having the same specifications as a compact disc (hereinafter, abbreviated to CD), has a simple structure and is also easy to use, and therefore this type of cleaner is widely used (see, for example, Japanese Patent Laid-open Application No. H1-43386).

FIG. 7 and FIG. 8 show prior art examples of a lens cleaner of this kind. Of these, the lens cleaner shown in FIG. 7 comprises bristle brushes 2 disposed at two mutually adjacent positions in the radial direction of the disc 1. Furthermore, the lens cleaner shown in FIG. 8 comprises bristle brushes 2 disposed at eight positions in the circumferential direction, the brushes being distributed in a spiral fashion in such a manner that they gradually become further separated from the centre of the disc 1.

Similarly to a normal CD, in the case of these lens cleaners illustrated in FIG. 7 and FIG. 8, the disc 1 is inserted into the CD player and is transported to a reading position, whereupon cleaning of the object lens is performed by using a standard reading operation by the device mechanism, in other words, operation of the optical pick-up in the radial direction of the disc and rotation of the disc 1. More specifically, by means of the operation of the optical pick-up in the radial direction of the disc, positional alignment between the bristle brushes 2 and the object lens is achieved, and by causing the bristle brushes 2 to move with respect to the object lens whilst in a state of contact with same, by rotation of the disc 1, it is possible readily to remove the dirt adhering to the object lens. Furthermore, various types of cleaning agents for lens cleaning have also been developed, and by applying a cleaning agent of this kind to the bristle brushes 2 and then performing the operation described above, it is possible to improve cleaning performance. Moreover, prior art technology has also been proposed for a lens cleaner which cleans a lens by means of a rotating disc, as described previously, wherein lens cleaning is performed by automatically detecting the installation of the lens cleaner, on the basis of the difference in light exposure between a normal disc and a lens cleaner disc (for example, Japanese Patent Laid-open Application No. H1-140482). Furthermore, a cleaning cartridge has also been proposed, wherein a brush and an operating lever are provided in a cartridge case, this cartridge case is installed in an optical disc device, the operating lever, which is exposed to the outside of the device, is operated, and the object lens inside the device is cleaned by means of the brush (see, for example, Japanese Patent Laid-open Application No. S63-313378).

However, problems of the following kind exist in conventional lens cleaners such as those described above.

Firstly, in the case of a method for cleaning an object lens by causing a lens cleaner disc to rotate by means of the device mechanism, there is a drawback in that cleaning of the object lens cannot be carried out unless the disc rotates. More specifically, in general CD players are composed in such a manner that, from the viewpoint of preventing inappropriate operation in the event of a defective disc, if the disc management information cannot be read from a disc satisfactorily by the object lens, such disc is regarded to be a defective disc, and all operation of the device including rotation of the disc is halted. Therefore, if the soiling of the object lens is very bad, then it will not be possible to cause the lens cleaner disc to rotate, and hence cleaning of the object lens will become impossible.

In cases such as these, it is difficult for a general user to clean the object lens by himself or herself, and hence it is necessary that the service department of the manufacturer or the supplier performs the tasks of disassembling the CD player, removing the whole optical pick-up, and replacing it with a new optical pick-up. Therefore, it is difficult for the user to use the CD player over a long period of time, and furthermore, the economic burden on the user is increased.

To deal with this situation, it has been conceived to adopt a device which transfers to a lens cleaning operation by automatically detecting insertion of a lens cleaner as disclosed in Japanese Patent Laid-open Application No. H1-140482. However, since the detection of insertion of a lens cleaner is based on detection of the difference in the light exposure by means of the optical pick-up, then if the soiling of the object lens itself is very bad, there is a possibility that misdetection may occur. Moreover, a special structure is required in the optical disc device in order to detect the lens cleaner, and hence the device becomes more complicated.

Furthermore, even if it is possible to clean the object lens by rotating the disc, since the bristle brushes projecting from the disc also make contact with other regions in addition to the object lens, then the cover of the optical pick-up, and the like, forms an obstacle and the bristle brushes do not make satisfactory contact with the object lens, and hence there is a possibility that effective cleaning will no longer be achievable. Moreover, there is also a possibility that secondary problems may arise, for instance, that grease in the vicinity of the optical pick-up may conversely be applied to the object lens by means of the bristle brushes.

In particular, in the case of DVD players, which have become remarkably widespread in recent years, the object lens of the optical pick-up is extremely small, and therefore it is highly susceptible to soiling and effective measures against soiling are required. Furthermore, in the case of a device used in a vehicle, such as a car-mounted sound system or navigation system, there is a requirement for the device to be accommodated within a limited space, regardless of the fact that it is liable to the effects of dust, or the like, and hence the device itself must be consolidated in a compact shape. Therefore, in a rotary type lens cleaner such as those described above, the bristle brushes make contact with members which are disposed in the narrow space in the periphery of the optical pick-up and dirt on these is liable to become adhered to the optical pick-up.

In order to counter this, as indicated by Japanese Patent Laid-open Application No. S63-313378 described above, a cleaning cartridge has been proposed whereby, rather than using a rotary type device, cleaning is performed manually by means of an operating lever which is exposed to the outside of the device, but the optical disc devices to which a cartridge type system can be applied are limited. Furthermore, there is also a possibility that the cartridge may impact with the optical pick-up or other members, and it is not appropriate for compact devices. In particular, there is a possibility that the insertion hole or members in the proximity thereof may be damaged by contact with the rod-shaped operating lever. Moreover, since it is necessary to adopt a constitution wherein the actual box-shaped cartridge itself corresponds to the interior of the optical disc device, then the constitution of the cartridge becomes complex, liable to fracturing, and incurs manufacturing costs.

SUMMARY OF THE INVENTION

The present invention was devised in order to resolve the aforementioned problems of the prior arts, and a first object of the present invention being to provide a simple and inexpensive lens cleaner which is capable of cleaning an object lens simply and reliably, in a standard disc device, without causing a disc to rotate, by not recording a signal which can be the subject of focussing, on the disc. Moreover, it is a second object of the present invention to provide an effective lens cleaning method using a lens cleaner of this kind.

In order to achieve the aforementioned objects, the present invention have the following technical characteristics in a lens cleaner for an optical disc device, wherein a cleaning member that makes contact with the object lens of an optical disc device is provided on a disc, in order to clean the object lens.

Namely, in one aspect of the present invention, an operating member for operating the disc from the outside of the device is installed on said disc, and there is no recording face that can be the subject of focussing by said object lens, or no signal that can be the subject of focussing by said object lens is recorded, on the face of said disc facing the object lens.

According to the first aspect of the present invention as described above, when the disc is inserted into the device, since no signal is recorded on the disc, focussing cannot be performed and hence the mechanism of the device automatically halts. Therefore, the insertion of a lens cleaner can be detected correctly, regardless of the degree of soiling of the actual object lens and even without provided a special structure in the device, and by causing the disc to move back and forth by operating an operating member from the outside of the device, it is possible to perform cleaning of the object lens by means of the cleaning member.

Furthermore, since this system does not involve causing the disc to rotate, it is possible to prevent the occurrence of secondary problems, such as grease in the proximity of the optical pick-up being transferred to the object lens by means of the cleaning member. Consequently, even in the case of devices having very small object lenses, or even in the case of compact devices where the distance between the object lens and other members is very short, it is still possible to clean the object lens in a simple and reliable manner, by means of simple operation from outside of the device.

In one aspect of the present invention, water containing few or little impurities is contained in the cleaning member.

According to the second aspect of the present invention as described above, since water containing few or little impurities is used as a cleaning liquid for the object lens, it is possible to perform reliable cleaning, without the occurrence of striping patterns due to impurities on the object lens, in comparison with cases where alcohol or tap water are used.

In one aspect of the present invention, the cleaning member is disposed on both faces of the disc.

According to the third aspect of the present invention as described above, since the cleaning member is disposed on both faces of the disc, it is possible to compose a lens cleaner which is able to correspond to a plurality of devices, by adjusting the respective positions of the cleaning members to the positions of the object lens in different optical disc devices.

In one aspect of the present invention, the operating member is constituted by a flexible member.

According to the fourth aspect of the present invention as described above, since the operating member which is exposed to the outside of the device is flexible, it does not cause damage to the device.

Further, in another aspect, the present invention provides a lens cleaning method for an optical disc device for cleaning the object lens of an optical disc device by using a lens cleaner selected from the lens cleaners according to the first to fourth aspects of the present invention as described above, comprising the steps of: inserting the disc into the optical disc device in such a manner that the operating member is led out of the device; causing the object lens to move in a direction for making contact with the disc and to attempt to focus on the disc; halting a playback operation of the disc by the optical disc device, as a result of the object lens having failed to focus; performing cleaning of the object lens by means of the cleaning member, by causing the disc to move by operating the operating member; and ejecting the disc to the outside of the optical disc device.

According to this method, it is possible sufficiently to display the aforementioned action of the lens cleaner according to the first to fourth aspects of the present invention, and cleaning of an object lens can be performed in a simple and reliable manner.

DESCRIPTION OF THE PREFERRED EMBODIMENTS

Below, an embodiment of the present invention is described in concrete terms with reference to FIG. 1 to FIG. 6.

1. Constitution of the Lens Cleaner

Figure 1:
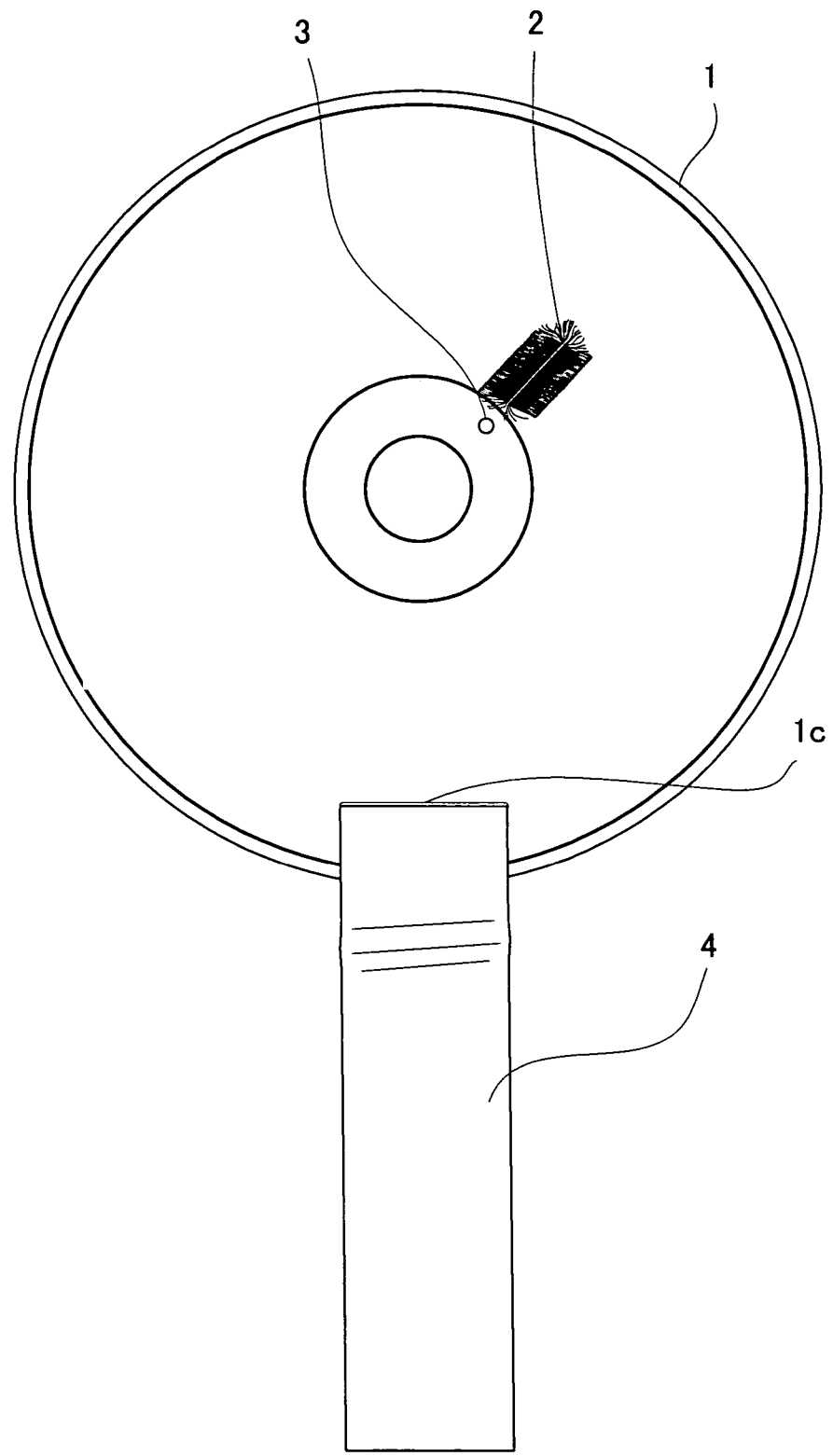
FIG. 1 is a plan view showing a cleaning face of a lens cleaner relating to one embodiment of to which the present invention is applied.
Figure 2:
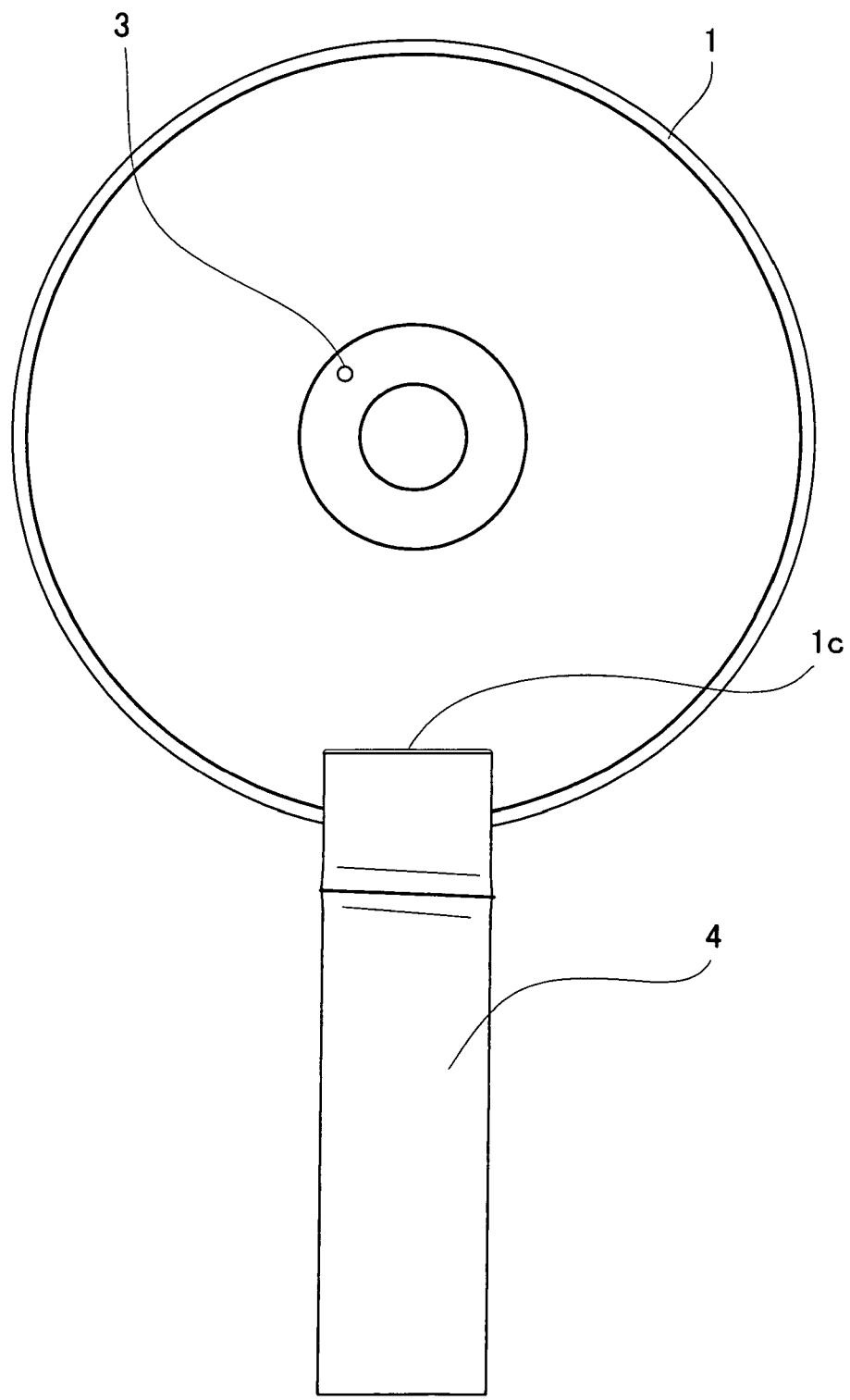
FIG. 2 is a plan view showing a label display face of the lens cleaner in FIG. 1.

FIG. 1 and FIG. 2 are plan views showing a lens cleaner relating to one embodiment in which the present invention is applied, FIG. 1 illustrates a cleaning face and FIG. 2 illustrates a label display face. As shown in FIG. 1, the lens cleaner relating to the present embodiment uses a disc 1 which is of substantially the same specification as a CD, and a cleaning face is constituted by installing bristle brushes 2, which are cleaning members, on the face corresponding to the signal reading face of the CD. An operating ribbon 4 for operating the disc is installed in a portion of the disc 1 in the vicinity of the edge thereof. Below the constitution of each portion of the disc is described in more detail.

Figure 3:
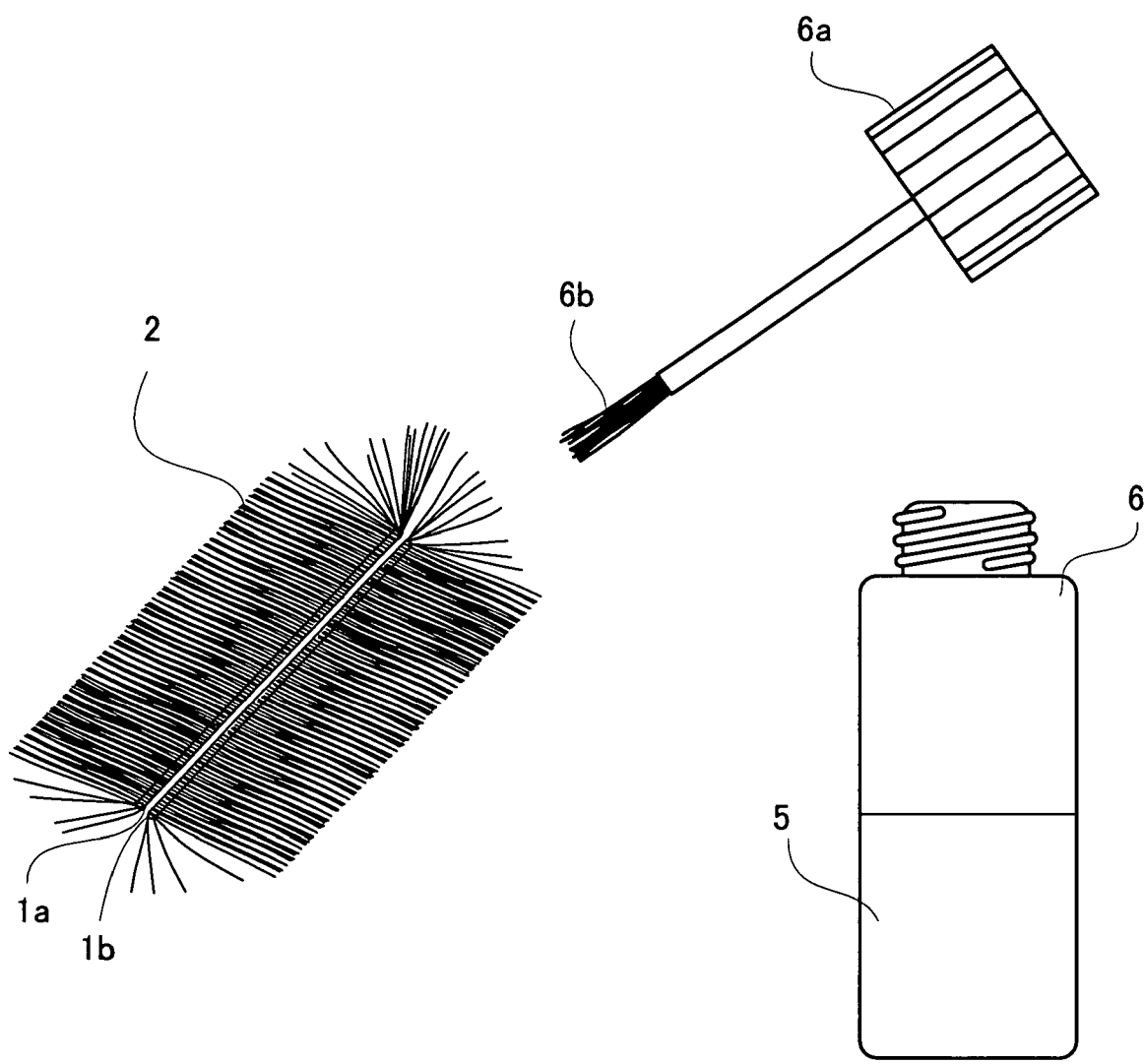
FIG. 3 is a perspective view showing the a bristle brush of the lens cleaner in FIG. 1 and the distribution of cleaning liquid with respect to same.
Figure 4:
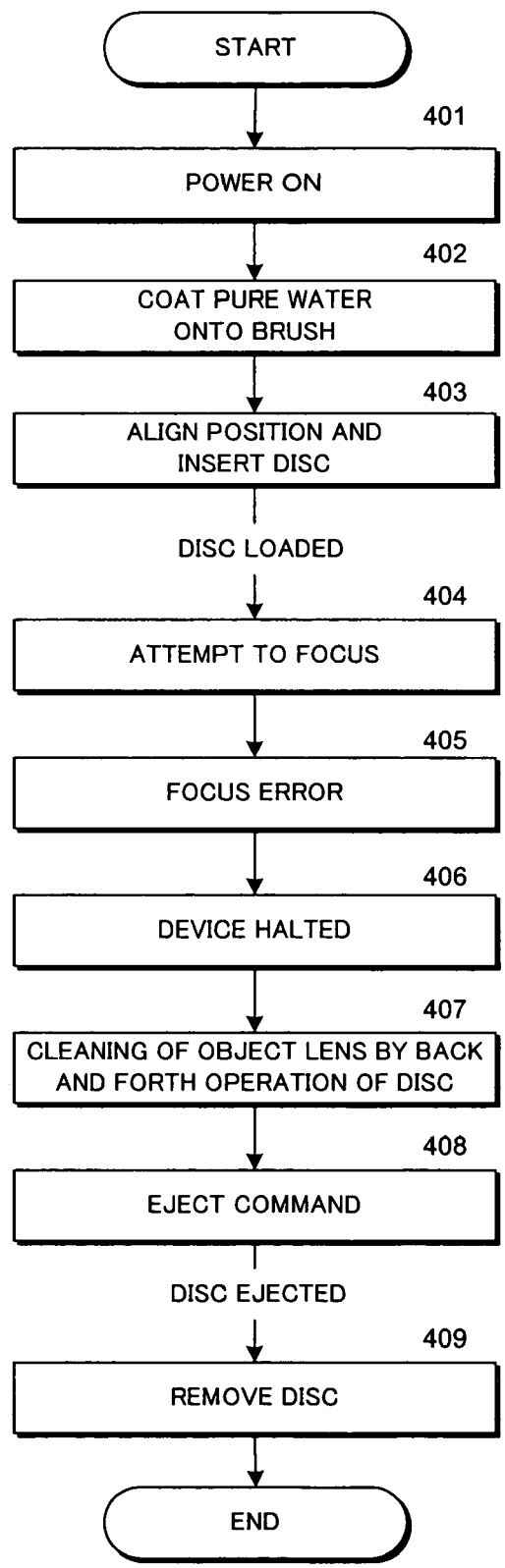
FIG. 4 is a flowchart showing one example of a procedure wherein an object lens is cleaned by using the lens cleaner in FIG. 1.
Figure 6:
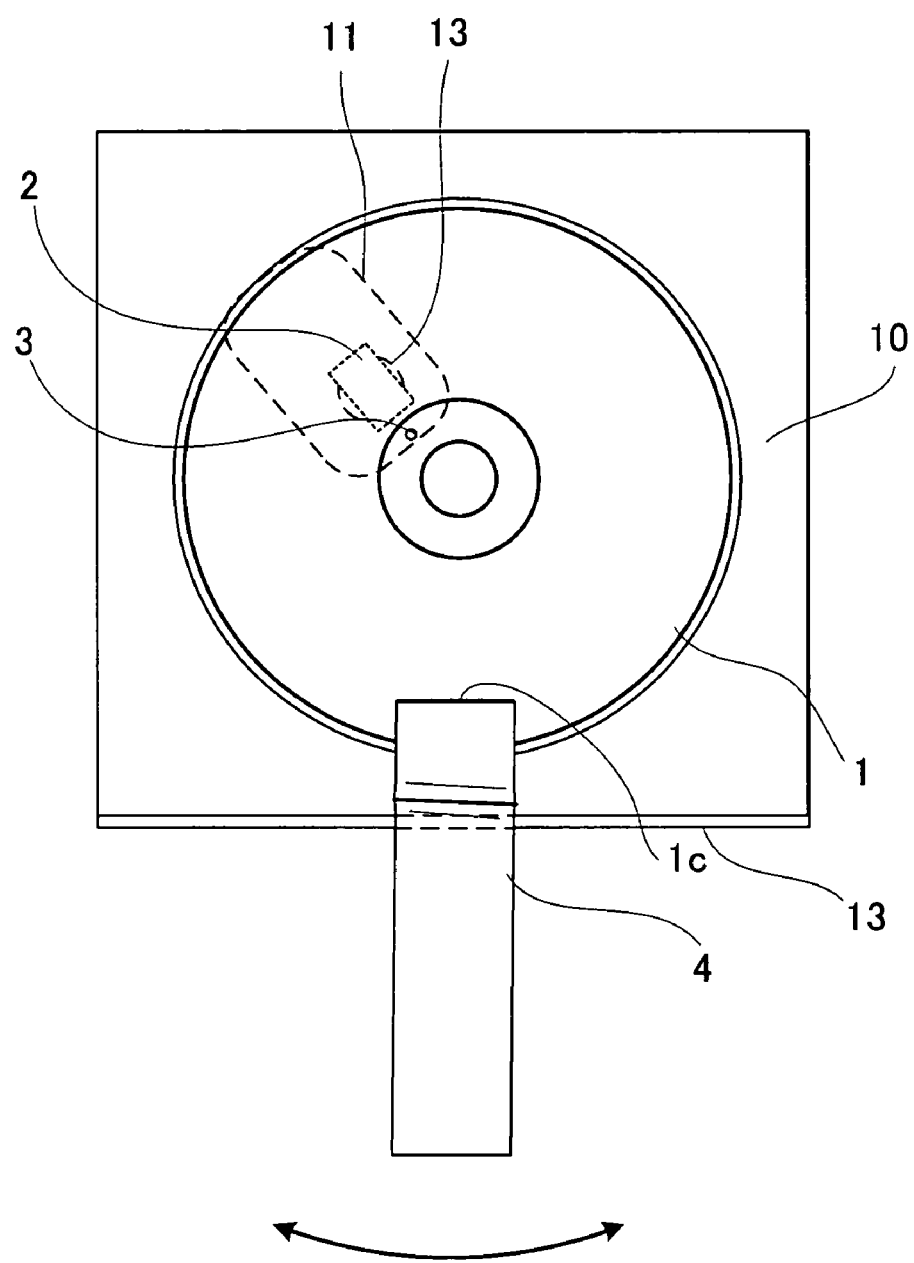
FIG. 6 is a plane view showing a state wherein the disc has reached a prescribed loading completed position, from the state shown in FIG. 5, and is located in a suitable cleaning start position with respect to the object lens.
Figure 7:
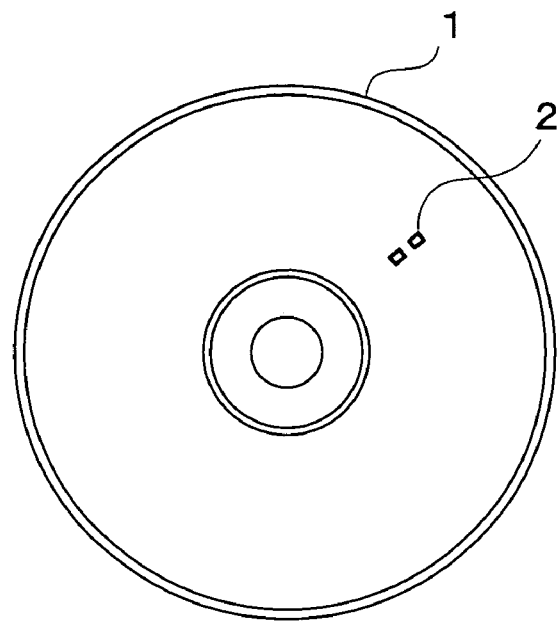
FIG. 7 is a plan view showing one example of a disc type lens cleaner according to the prior art.
Figure 8:
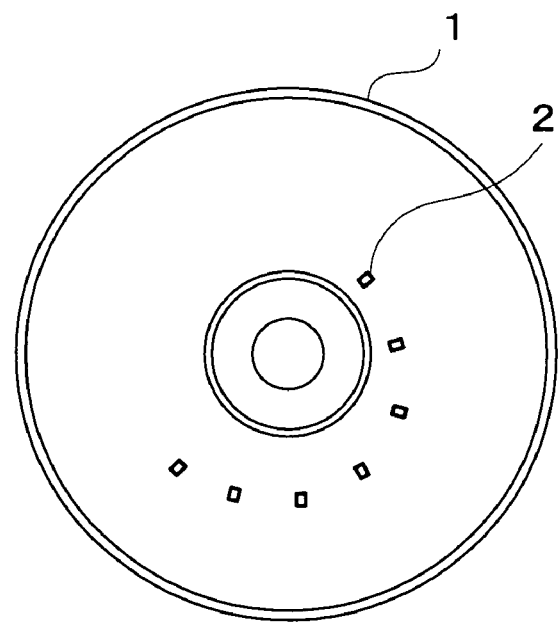
FIG. 8 is a plan view showing a further example of a disc type lens cleaner according to the prior art.

Firstly, as shown in FIG. 1 and FIG. 3, a bristle brush 2 is constituted by providing groove holes 1a, 1b formed in two parallel columns in the vicinity of the inner circumference of the cleaning face of the disc 1, passing nylon fibres, or the like, from one of the groove holes 1a and causing the fibres to project from the one of the other groove holes 1b. As shown in FIG. 2, a label display face to which a label, or the like, is stuck, is formed on the opposite face of the disc 1, and therefore the bristle brush 2 itself cannot be seen from the side of the label display face. However, a mark 3 is provided on the transparent face to the inner circumference side of the bristle brush 2, and therefore it is possible to ascertain the position of the bristle brush 2 from the label display face also. As shown in FIG. 6, this bristle brush 2 is disposed in such a manner that it corresponds to the position of the object lens 12 of the optical pick-up 11.

Water containing few impurities, for example, so-called pure water, ultra-pure water, or the like, is used as a cleaning liquid for cleaning the object lens 12. Pure water is tap water, or the like, from which impurities, like positive ions, such as calcium, magnesium, or the like, or negative ions, such as chlorine, nitric acid, or the like, which are contained in extremely small quantities, have been removed as far as possible, and it can be obtained by subjecting the water to deionisation processing by passing it through filters and ion exchange membranes, heating and distilling the water, or performing distillation of water which has undergone ion exchange. Ultra pure water is pure water which is extremely close to theoretical water of 100 percent purity, and the purity thereof is raised by subjecting pure water to further purification. Pure water or ultra-pure water of this kind is often used for cleaning in manufacturing processes for electronic components, and it is also possible to employ water used in the manufacturing processes for CDs, and the like. FIG. 3 shows a container 6 which accommodates cleaning liquid 5 such as that described above, and a brush 6b which is provided on the lid 6a of the container 6 for the purpose of cleaning the bristle brush 2.

Furthermore, a fine installation hole 1c is provided in a portion of the disc 1 in the vicinity of the edge thereof, in an orthogonal direction to the radius of the disc 1. One end of an operating ribbon 4 which is a band made from nylon is passed through this installation hole 1c and installed in such a manner that it forms a loop. The other end of the operating ribbon 4 is extended in such a manner that it projects externally when the disc 1 is inserted into the CD player 10.

Furthermore, the face of the disc 1 according to the present embodiment which opposes the optical pick-up 11 is constituted in such a manner that it functions as a focus preventing face, or a face on which focussing is impossible. In other words, in the case of a standard CD, a signal is recorded and is the subject of focussing by upward and downward movement of the optical pick-up 11, but in the case of the disc 1 according to the present embodiment, the cleaning face, in other words, the face which opposes the optical pick-up 11, is not recorded with any signal which can be the subject of focussing, or alternatively, it is composed without having any recording face at all. For example, this is a disc 1 in which, although it does have a layer on which a signal should be recorded, no signal (pits) are recorded thereon, or it is a disc 1 which does not have any layer on which a signal should be recorded, apart from which, it is formed from a similar material to that of a normal CD. By means of this constitution, the laser light for performing focussing is not reflected back appropriately, or it is transmitted through the disc.

2. Cleaning Method

The procedure for actually performing cleaning of the object lens 12 of the optical pick-up 11, using the lens cleaner having the constitution described above, is as illustrated in FIG. 4 to FIG. 6. Here, as an example, a general CD player 10 which starts an operation of reading the disc 1 automatically when a disc 1 is transported thereto shall be described.

Figure 5:
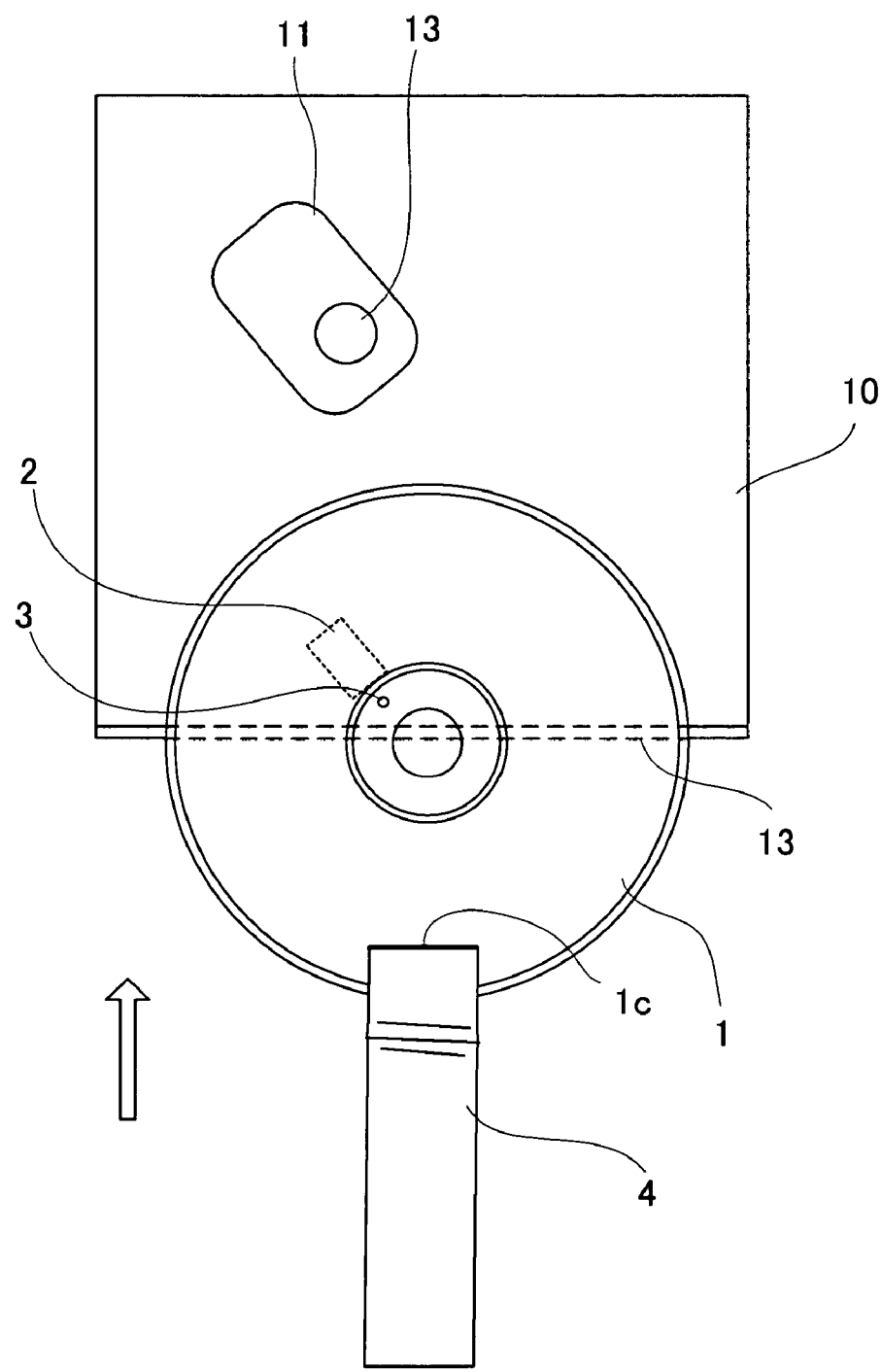
FIG. 5 is a plan view showing a state wherein the lens cleaner in FIG. 1 is inserted into an optical disc device.

Firstly, the power supply to the CD player 10 is switched on and the CD player 10 is activated (step 401), whereupon one or two drops of the cleaning liquid 5 contained in the container 6 are applied to the bristle brush 2 of the lens cleaner illustrated in FIG. 3, by means of the brush 6b (step 402). Next, as shown in FIG. 5, the position of the disc 1 is aligned with the disc insertion hole 13 of the CD player 10, the operating ribbon 4 being positioned closer to the operator, and the disc 1 is then inserted up to a prescribed disc insertion position the disc can be loaded by the device mechanism, in a similar manner to a normal CD (step 403). As a result of this, disc loading is performed by the mechanism of the CD player 10. Thereupon, as illustrated in FIG. 6, when the disc loading has been completed and the disc 1 has reached a playback position, the player attempts to perform focussing by moving the optical pick-up 11 in the upward and downward.

During this attempt, since there is no signal recorded on the disc 1, focussing is not achieved, the mechanism judges that there is an error (step 405), and then halts in this state (step 406). In a CD player 10 of this kind, in general, the disc rotation motor does not rotate until focussing has been achieved. Moreover, in this case, the disc 1 remains inserted in the device. Furthermore, since the angle of insertion of the disc 1 by the user is not necessarily uniform, there will be cases where the exposed face of the disc 1 outside the region of the bristle brush 2 is opposing the optical pick-up 11, and cases where the bristle brush 2 is opposing the optical pick-up 11. Consequently, even though it may occur that focussing happens to be impossible due to the presence of the fibres of the bristle brush 2, it is not possible reliably to prevent focussing by means of this alone. In the present embodiment, the possibility of focussing is prevented reliably, by omitting to record a signal on the disc 1.

In this way, when the mechanism is in a halted state, by causing the ribbon 4 which is exposed to the exterior of the device to perform a back and forth movement in the longitudinal direction of the disc insertion hole 13 (the direction indicated by the arrows in FIG. 6), the disc 1 is caused to rotate and as a result of this, the bristle brush 2 makes contact with the object lens 12, thereby performing cleaning (step 407). When the lens cleaning operation has been completed, the standard eject button (ejection command input section) is pressed, thereby issuing an eject command (step 408). Consequently, the disc 1 is ejected by the mechanism of the CD player 10. After this eject operation, the ejected disc 1 is removed from the disc insertion hole 13 (step 409).

3. Action and Advantageous Effects

According to the lens cleaner relating to the present embodiment as described above, since no signal is recorded on the disc 1, then even if the disc 1 is inserted into the CD player 10, no focussing operation is performed, and hence the mechanism halts automatically. Consequently, it is possible to detect the lens cleaner accurately, regardless of the degree of soiling of the actual object lens 12. Furthermore, since a special structure for detecting the lens cleaner is not required in the CD player 10, the device can be simplified.

Moreover, since cleaning is performed by causing the bristle brushes 2 provided in the minimum necessary portion of the disc to perform a slight back and forth movement, then compared to cases where cleaning is performed by rotating a disc 1, or where the bristle brush 2 is provided over the whole face of the disc 1, here, there is no soiling of the bristle brush 2 due to grease, of the like, by contact with members other than the optical pick-up 11, nor any occurrence of this soiling becoming adhered to the object lens 12. This is particularly beneficial in the case of devices which use very small object lenses 12, such as DVD players, or in the case of devices such as car-mounted devices, which are liable to the effects of dust, and the like, but which have a compact constitution and comprise a short distance between the optical pick-up 11 and the peripheral members.

Furthermore, since a normal disc 1 of a standard format can be used, it is possible to apply the cleaner to any type of optical disc device, in comparison with prior art devices of a cartridge design, as described above. For example, the disc 1 is similar to a blank type disc which is not accommodated in a cartridge, or the like, and the operating ribbon 4 is a band-shaped member having flexibility, which is attached to the edge of the disc 1. Therefore, even in the case of disc devices of a type which perform holding (chucking) of the inner circumference of a disc 1 by means of a turntable and a clamper, there exists no portion which may obstruct the turntable or clamper. Consequently, it is possible to perform cleaning whilst holding the disc 1 by means of the turntable and the damper and taking the turntable and damper as the centre of rotation. Furthermore, even in the case of disc devices which use loading rollers, there are no portions which may obstruct the loading operation, and hence smooth insertion, cleaning and ejection can be achieved. Moreover, since the disc can be inserted in a similar manner to a normal disc 1, there is no possibility of it impacting with the optical pick-up 11 or other members, and hence it is suitable for compact devices. In particular, since the operating ribbon 4 is flexible, even if it does make contact with the disc insertion hole 13 or the members in the proximity thereof, there is no possibility of it damaging them. In addition, when the disc 1 is accommodated in a case, or the like, since the operating ribbon 4 can be folded up, it does not cause an obstruction. Furthermore, since a constitution is adopted wherein an operating ribbon is provided in a normal disc 1 of a standard format, this constitution is simple, not liable to breaking, and does not incur manufacturing costs.

Moreover, if alcohol, or the like, is used as the cleaning liquid 5, then a striped pattern may be left on the object lens 12 due to the dirt that was dissolved in the alcohol, when the alcohol has evaporated off, and furthermore, if water such as tap water, which contains large amounts of impurities, such as kalk, or the like, is used, then a striped pattern will also be left by the impurities after evaporation. However, in the present embodiment, since water containing very few impurities is used, no striped pattern, or the like, is left after evaporation, and hence cleaning can be performed reliably. This has been corroborated by means of experimentation.

4. Other Embodiments

The present invention is not limited to the embodiment described above, and many various modifications of different types may also be implemented within the scope of the present invention. For example, it is also possible to provide bristle brushes on either face of the disc. In this case, it is possible to compose a disc cleaner which is able to correspond to the optical disc devices of a plurality of manufacturers, by altering the positioning of the bristle brush on the respective faces so as to align it with optical disc devices having different positions for the optical pick-up.

It is also possible for the physical constitution of the cleaning member, in terms of the material and shape thereof, and the like, to be selected appropriately. In the embodiment described above, an example was described wherein a bristle brush was passed through grooves formed in the disc, but the method of installation of the bristle brush, and the number of brushes, and the like, may be selected freely. For example, it is possible to affix a bristle brush and it is also possible to provide the brush detachably, in accordance with the position of the optical pick-up. Moreover, the cleaning member used in the present invention is not limited to being a bristle brush, and cleaning members of various types which are suitable for cleaning an object lens may also be used similarly, and similar excellent advantageous effects may be obtained in such cases.

Similarly, the physical constitution of the operating member, in terms of the material and shape thereof, and the like, may also be selected appropriately. For example, it is conceivable that a wire shaped, cord shaped or thread shaped members which is narrower than a band-shaped ribbon may be used. Furthermore, a knob, loop, or the like, may also be provided on the side which is exposed outside the device, and in this case, the user is able to operate the disc readily by grasping the knob or passing his or her finger through the loop. Moreover, it is also possible to provide a plurality of operating members.

Furthermore, the installation method used for the operating member is not limited to that described in the foregoing embodiment, and it is possible to attach the member by sticking, or to make it detachable. In other words, provided that the operating member is a member which is capable of operating the disc from an external position after loading has completed, and which does not cause an obstruction to the loading of the disc, then it is possible to use various types of operating members, having various types of materials and shapes, as appropriate.

Moreover, for the disc section according to the present invention, it is possible to use any standard disc, such as a CD, DVD, or the like, which can be used at present or in the future. The material of the disc is generally polycarbonate, but it is not limited to this. By taking an unwanted disc and performing a coating process or surface roughening treatment, or the like, on the surface thereof, in such a manner that focussing cannot be achieved, then such a disc can be reused in the present invention. The optical disc device which is the subject of cleaning according to the present invention is not limited to being a CD player, but rather, the present invention may be applied to any device which uses disc type storage media, such as a DVD player, car navigation system, or the like.

As described above, according to the present invention, by omitting to record a signal which can be subjected to focussing on a disc, then it is possible to perform cleaning of an object lens readily and reliably, even in a standard disc device, without causing the disc to rotate, and furthermore, it is possible to provide a simple and inexpensive lens cleaner. Moreover, it is also possible to provide an effective lens cleaning method which uses a lens cleaner of this kind.

What is claimed is:

1. A lens cleaner for an optical disc device, comprising:
   a cleaning member that is provided on a disc to make contact with an object lens of an optical disc device, in which said disc is not caused to rotate until a focusing operation has been successfully achieved, in order to clean the object lens,
   wherein an operating member for operating the disc from the outside of the device is installed on said disc; and
   a focus preventing face is provided on the face of said disc facing the object lens, which prevents focusing by preventing an appropriate reflection of the laser light for performing focusing when the power supply of the optical disc device is on, the focus preventing face is a face on which no signal capable of being a subject of focusing by said object lens is recorded, or a face which does not have any recording layer at all on which a signal could be recorded.

2. The lens cleaner for an optical disc device according to claim 1,
   wherein water containing few or little impurities is contained in said cleaning member.

3. The lens cleaner for an optical disc device according to claim 2, wherein said cleaning member is disposed on both faces of said disc.

4. The lens cleaner for an optical disc device according to claim 2, wherein said operating member is constituted by a flexible member.

5. A lens cleaning method for an optical disc device for cleaning the object lens of an optical disc device by using a lens cleaner selected from the lens cleaners according to claim 2, comprising the steps of:
   inserting said disc into the optical disc device in such a manner that said operating member is led out of the device;
   causing said object lens to move in a direction for making contact with said disc and to attempt to focus on the disc;
   halting a playback operation of said disc by said optical disc device, as a result of said object lens having failed to focus;
   performing cleaning of said object lens by means of said cleaning member, by causing the disc to move by operating said operating member; and
   ejecting said disc to the outside of the optical disc device.

6. The lens cleaner for an optical disc device according to claim 1 wherein said cleaning member is disposed on both faces of said disc.

7. The lens cleaner for an optical disc device according to claim 6, wherein said operating member is constituted by a flexible member.

8. A lens cleaning method for an optical disc device for cleaning the object lens of an optical disc device by using a lens cleaner selected from the lens cleaners according to claim 6, comprising the steps of:
   inserting said disc into the optical disc device in such a manner that said operating member is led out of the device;
   causing said object lens to move in a direction for making contact with said disc and to attempt to focus on the disc;
   halting a playback operation of said disc by said optical disc device, as a result of said object lens having failed to focus;
   performing cleaning of said object lens by means of said cleaning member, by causing the disc to move by operating said operating member; and
   ejecting said disc to the outside of the optical disc device.

9. The lens cleaner for an optical disc device according to claim 1 wherein said operating member is constituted by a flexible member.

10. A lens cleaning method for an optical disc device for cleaning the object lens of an optical disc device by using a lens cleaner selected from the lens cleaners according to claim 9, comprising the steps of:
    inserting said disc into the optical disc device in such a manner that said operating member is led out of the device;
    causing said object lens to move in a direction for making contact with said disc and to attempt to focus on the disc;
    halting a playback operation of said disc by said optical disc device, as a result of said object lens having failed to focus;
    performing cleaning of said object lens by means of said cleaning member, by causing the disc to move by operating said operating member; and
    ejecting said disc to the outside of the optical disc device.

11. A lens cleaning method for an optical disc device for cleaning the object lens of an optical disc device by using a lens cleaner selected from the lens cleaners according to claim 1, comprising the steps of:
    inserting said disc into the optical disc device in such a manner that said operating member is led out of the device;
    causing said object lens to move in a direction for making contact with said disc and to attempt to focus on the disc;
    halting a playback operation of said disc by said optical disc device, as a result of said object lens having failed to focus;
    performing cleaning of said object lens by means of said cleaning member, by causing the disc to move by operating said operating member; and
    ejecting said disc to the outside of the optical disc device.

12. A manual lens cleaner for an optical disc device, comprising:
    a substrate of a size and configuration of an optical disc, operable in the optical disc device, having a non-focusing surface that prevents focusing by the optical disc device to intentionally provide an error signal during an initial focusing operation by an optical pick-up unit in the optical disc device whereby the optical disc device will suspend further operation and will not rotate the substrate;

a cleaning member provided on the non-focusing surface of the substrate of a configuration for insertion into an optical disc player and contact with a lens on the optical pick-up unit; and a relatively flexible operating member extending from the substrate of a configuration to have an operator portion to be positioned external of the optical disc player and having sufficient rigidity to enable an operator to move the cleaning member relative to the lens in the optical disc player to clean the lens.

13. The lens cleaner of claim 12 wherein the cleaning member has a surface that prevents focusing of the lens.

14. The lens cleaner of claim 12 wherein a second cleaning member is provided on an opposite side of the substrate.

15. A method of cleaning an optical disc player comprising the steps of:

providing a disc substrate with a cleaning member on a non-focusing surface and a flexible operating member extending from the disc substrate;

powering the optical disc player to an operation state;

inserting the disc substrate into the optical disc player to position the cleaning member adjacent a lens to be cleaned while maintaining the flexible operating member to have an operator portion external of the optical disc player, the operator portion having sufficient rigidity to enable an operator to move the cleaning member relative to the lens when installed in the optical disc device;

causing an error signal to occur in the operation state of the optical disc player when it attempts to focus on the non-focusing surface whereby the lens is held in a stationary position above the disc substrate; and manually moving the cleaning member relative to the lens by exerting a force through the operator portion to clean the lens.

* * * * *